United States Patent
Hart et al.

[11] Patent Number: 5,833,721
[45] Date of Patent: Nov. 10, 1998

[54] ADDITIVE FOR HYDROCARBON OILS

[75] Inventors: Richard Joseph Hart, Didcot; Rinaldo Caprotti, Oxford, both of United Kingdom

[73] Assignee: Exxon Chemical Patents Inc, Linden, N.J.

[21] Appl. No.: 800,746

[22] Filed: Feb. 14, 1997

Related U.S. Application Data

[63] Continuation of Ser. No. 592,390, filed as PCT/EP94/02564 Aug. 2, 1994, abandoned.

[30] Foreign Application Priority Data

Aug. 3, 1993 [GB] United Kingdom .................. 9316021

[51] Int. Cl.$^6$ .................................. C10L 1/28; C10L 1/22
[52] U.S. Cl. .............................. 44/320; 44/425; 44/432; 44/418; 44/419; 44/347
[58] Field of Search ............................. 44/320, 347, 419, 44/418, 425, 432

[56] References Cited

U.S. PATENT DOCUMENTS

| | | | |
|---|---|---|---|
| 3,233,986 | 2/1966 | Morehouse | 44/320 |
| 3,384,600 | 5/1968 | Domba | 44/320 |
| 3,784,479 | 1/1974 | Keil | 252/358 |
| 4,028,218 | 6/1977 | Fink | 252/321 |
| 4,062,785 | 12/1977 | Nibert | 426/531 |
| 4,460,380 | 7/1984 | Rehrer | 44/320 |
| 4,866,141 | 9/1989 | Gutierrez et al. | 252/49.6 |
| 4,954,277 | 9/1990 | Gutierrez et al. | 252/49.6 |
| 5,084,197 | 1/1992 | Golic et al. | 252/52 A |
| 5,198,135 | 3/1993 | Golic et al. | 252/52 A |
| 5,397,367 | 3/1995 | Fey et al. | 44/320 |
| 5,542,960 | 8/1996 | Grabowski | 44/320 |
| 5,613,988 | 3/1997 | Spiegler et al. | 44/320 |
| 5,620,485 | 4/1997 | Fey et al. | 44/320 |

*Primary Examiner*—Margaret Medley
*Attorney, Agent, or Firm*—J. J. Mahon

[57] ABSTRACT

An antifoam additive for hydrocarbon oils and in particular fuel oils comprises the combination of an antifoam agent and an ashless dispersant.

2 Claims, No Drawings

ADDITIVE FOR HYDROCARBON OILS

This is a continuation of application Ser. No. 592,390, filed as PCT/EP94/02564 Aug. 2, 1994 now abandoned.

This invention concerns additives which render antifoam agents more suitable for use in hydrocarbon oils.

Foam may arise in industrial processes which involve liquids. In particular the foaming of oleaginous liquids, for example hydrocarbon oils such as gasoline, kerosene and diesel fuel oils, may interfere with pumping especially through distribution systems, and may make measurements of true liquid level difficult. Foaming may also occur during the filling of tanks, resulting in wastage and the hazard of spilt liquid. Such foam-related problems are recognised in the art.

The problem of foaming of oleaginous liquids has been addressed by the use of antifoam additives, which impart a reduced foaming tendency to the liquids in question. Various compounds, many of which contain silicon, have been proposed as antifoam agents for oleaginous liquids. One commonly-used class of antifoam agents are the so-called silicone antifoam agents. These highly surface-active materials combine a number of properties including involatility, low surface tension, chemical inertness and partial insolubility in oleaginous liquids. Polydimethylsiloxanes are members of an important class of silicones used as antifoam agents; particularly useful polydimethylsiloxanes are those which have been copolymerized with poly(alkylene oxides) as disclosed in U.S. Pat. No. 3,233,986, U.S. Pat. No. 3,784,479 and U.S. Pat. No. 4,028,218.

Non-silicon-containing compounds, for example the ethylene bisamides and derivatives thereof described in U.S. Pat. No. 5,192,336, have also been proposed as antifoam agents for oleaginous liquids.

A known problem with antifoam compositions is diminution in antifoam performance with time, following addition to an oleaginous liquid. The mechanisms for such diminution are not completely understood. However, it is believed that the partial insolubility of antifoam agents in oleaginous liquids may lead to gradual coalescence of the antifoam, with an associated loss of antifoam performance. Adsorption of antifoam agents onto available surfaces, particularly storage vessel walls, is also believed to contribute to the diminution in performance.

In addition, particular problems are associated with the storage of oleaginous liquids such as hydrocarbon oils, especially fuels. Storage tanks for such oils are generally contaminated with minor amounts of insoluble material, including corrosion products, in the form of sediments or sludge or both. Highly surface-active antifoam agents, in particular the silicone antifoam agents commonly used with such oils, tend to associate with these corrosion products. This association (or 'pick-up') leads to transportation of the sediments or sludge within the bulk fuel and may result in filter blockage at various points along the oil distribution system.

Thus, significant problems exist with the use of antifoam agents and there is a continuing need to identify antifoam compositions which, following addition to a hydrocarbon oil, better maintain their performance with time and exhibit reduced association with sediments or sludge.

It has now been discovered that certain nitrogen-containing compounds, when present as co-additives, inhibit the association of said antifoam agents with sediments or sludge.

In a first aspect therefore, the present invention provides an additive composition comprising components (a) and (b) wherein (a) is an antifoam agent, and
(b) is a nitrogen-containing ashless dispersant characterised in that the weight of nitrogen present in the composition within component (b) is in the range of 8% to 100% of the total weight of component (a).

In a second aspect, the present invention provides a liquid composition comprising a major proportion of a hydrocarbon oil and a minor proportion of the additive according to the first aspect.

In a third aspect, the present invention provides an additive concentrate comprising the additive according to the first aspect in admixture with a suitable solvent therefor.

In a fourth aspect, the present invention provides the use of component (b) of the additive according to the first aspect for inhibiting the association, in a hydrocarbon oil, of an antifoam agent with sediments or sludge.

It has also been discovered that certain nitrogen-containing compounds, when present as co-additives for antifoam agents, inhibit the aforementioned diminution in antifoam performance.

In a fifth aspect therefore, the present invention provides the use of an ashless dispersant containing at least one primary amine group for inhibiting the diminution of antifoam performance with time, in a hydrocarbon oil, of component (a) as defined in any of claims 1 to 5.

According to the first, second, third and fourth aspects, it has surprisingly been found that the association of antifoam agents with sediments or sludge is inhibited by co-addition of a weight of nitrogen within an ashless dispersant which is in the range of 8% to 100% of the total weight of said antifoam agent. The chemical structure of the ashless dispersant does not appear to determine its effectiveness as inhibitor.

According to the fifth aspect of the invention, it has surprisingly been discovered that inhibition of the diminution in antifoam performance appears largely independent of the quantity of ashless dispersant present within the oil.

The two technical advantages of the present invention are not mutually exclusive; thus ashless dispersants containing primary amine functionality can provide both advantages simultaneously.

The various aspects of the invention will now be discussed in more detail as follows.

ANTIFOAM AGENT

The antifoam agent may be a silicon-containing, or non silicon-containing, antifoam agent.

The term silicon-containing antifoam agent refers to any antifoam agent which contains silicon in either a solid phase component, or in a liquid phase component, or if present in both of these phases. Particularly suitable silicon-containing antifoam agents for use in accordance with the present invention include organosilicon compounds, such as silicones. Preferred organosilicon compounds are siloxane polymers of general formula I

wherein R represents a hydrocarbyl group, n represents an integer in the range of 1 to 3 and m represents a number $\geq 2$. The hydrocarbyl group may be a relatively simple hydrocarbyl group of from 1 to 30 carbon atoms or may be a polymeric group. The groups represented by R may be the same or different in any given siloxane group or throughout the siloxane polymer and the value of n in the various siloxane groups in the siloxane polymer may be the same or different.

The preferred polymers are block co-polymers comprising at least two blocks, one block comprising siloxane groups as represented by general formula I and the second block comprising oxyalkylene groups of general formula II $$(R^1-O) \tag{II}$$

The siloxane block and the oxyalkylene block may be linked to each other by means of a divalent hydrocarbyl group; this may be R in general formula I. Hence each siloxane block contains at least one group represented by general formula I wherein at least one group represented by R is a divalent hydrocarbyl group. The siloxane block has a ratio of hydrocarbyl groups to silicon atoms of 1:1 to 3:1.

The hydrocarbyl groups that are represented by R in general formula I may be alkenyl groups for example vinyl and allyl; cycloalkenyl groups, for example cyclohexenyl; alkyl groups, for example methyl, ethyl, isopropyl, octyl and dodecyl; aryl groups, for example phenyl and naphthyl; aralkyl groups, for example benzyl and phenylethyl; alkaryl groups, for example styryl, tolyl and n-hexylphenyl; or cycloalkyl groups, for example cyclohexyl.

The divalent hydrocarbyl groups represented by R in general formula I may be alkylene groups such as methylene, ethylene, propylene, butylene, 2,2-di-methyl1,3-propylene and decylene, arylene groups such as phenylene and p,p'-diphenylene, or alkarylene groups such as phenyl-ethylene. Preferably the divalent hydrocarbyl group is an alkylene group containing from two to four successive carbon atoms.

These divalent hydrocarbyl groups are linked to a silicon atom of the siloxane block by a silicon-to-carbon bond and to an oxygen atom of the oxyalkylene block by a carbon-to-oxygen bond.

The siloxane block in the copolymers may contain siloxane groups that are represented by general formula I wherein either the same hydrocarbyl groups are attached to the silicon atoms (e.g. the dimethylsiloxy, diphenylsiloxy and diethylsiloxy groups) or different hydrocarbyl groups are attached to the silicon atoms (e.g. the methylphenylsiloxy, phenylethylmethylsiloxy and ethylvinylsiloxy groups).

The siloxane block in the copolymers may contain one or more types of siloxane group that are represented by general formula I provided that at least one group has at least one divalent hydrocarbyl substituent. By way of illustration only, ethylenemethylsiloxy groups can be present in the siloxane block or the siloxane block can contain more than one type of siloxane group, e.g. the block can contain both ethylenemethylsiloxy groups and diphenylsiloxy groups, or the block can contain ethylenemethylsiloxy groups, diphenylsiloxy groups and diethylsiloxy groups.

The siloxane block may contain trifunctional siloxane groups (e.g. monomethylsiloxane groups, $CH_3SiO_{1.5}$), difunctional siloxane groups (e.g. dimethylsiloxane groups, $(CH_3)_2SiO$, monofunctional siloxane groups (e.g. trimethylsiloxane groups, $(CH_3)_3SiO_{0.5}$) or combinations of these types of siloxane groups having the same or different substituents. Due to the functionality of the siloxane groups, the siloxane block may be predominantly linear or cyclic or crosslinked, or it may have combinations of these structures.

The siloxane block may contain organic end-blocking or chain-terminating organic groups in addition to the monofunctional siloxane chain-terminating groups encompassed by general formula I. Organic end-blocking groups may be hydroxyl groups, aryloxy groups such as phenoxy, alkoxy groups such as methoxy, ethoxy, propoxy and butoxy, and acyloxy groups such as acetoxy.

The siloxane blocks in the copolymers contain at least two siloxane groups that are represented by general formula I (so that m represents a number $\geq 2$). Preferably, the siloxane blocks contain a total of from five to twenty siloxane groups that are represented by general formula I, with m representing a number in the range of 5 to 20. That part of the average molecular weight of the copolymer that is attributable to the siloxane blocks may be as high as 50000 but preferably it is from 220 to 20000. If that part of the average molecular weight of the copolymer that is attributable to the siloxane blocks exceeds 50000 or if the siloxane blocks contain a total of more than twenty siloxane groups that are represented by general formula I, the copolymers are usually not as useful, e.g. they may be too viscous for convenient use in the additives of this invention.

The oxyalkylene blocks in the copolymers each contain at least two oxyalkylene groups that are represented by the general formula II wherein $R^1$ is an alkylene group. Preferably, at least 60 percent by weight of such groups represented by general formula II are oxyethylene or oxypropylene groups.

Other oxyalkylene groups that are represented by general formula II which can also be present in the oxyalkylene block, preferably in amounts not exceeding 40 percent by weight are oxy-1,4-butylene, oxy-1,5-amylene, oxy-2,2-dimethyl-1,3-propylene, or oxy-1,10-decylene groups.

The oxyalkylene blocks in the copolymers may contain oxyethylene or oxypropylene groups alone or along with one or more of the various types of oxyalkylene groups represented by general formula II; the oxyalkylene blocks can contain only oxyethylene groups or only oxypropylene groups or both oxyethylene and oxypropylene groups, or other combinations of the various types of oxyalkylene groups represented by general formula II.

The oxyalkylene blocks in the copolymers may contain organic end-blocking or chain-terminating groups. Such end-blocking groups may be hydroxy groups, aryloxy groups such as phenoxy, alkoxy groups such as methoxy, ethoxy, propoxy and butoxy, and alkenyloxy groups such as vinyloxy and allyloxy. A single group can serve as an end-blocking group for more than one oxyalkylene block; for example, the glyceroxy group can serve as an end-blocking group for three oxyalkylene chains.

The oxyalkylene blocks in the copolymers contain at least two oxyalkylene groups that are represented by general formula II. Preferably, each block contains from four to thirty of such groups. That part of the average molecular weight of the copolymer that is attributable to the oxyalkylene blocks can vary from 176 (for $(C_2H_4O)_4$) to 200000, but preferably it is from 176 to 15000. Provided that each oxyalkylene block contains at least two oxyalkylene groups represented by general formula II, the number of oxyalkylene groups and that part of the average molecular weight of the copolymer that is attributable to the oxyalkylene blocks is not critical, providing that the resulting copolymer is not rendered physically incompatible with oleaginous liquids. However, those copolymers in which that part of the average molecular weight that is attributable to the oxyalkylene blocks exceeds 200000 or that contain more than fifty oxyalkylene groups per block prove less useful, e.g. they are too viscous for convenient use in the additives of this invention.

The copolymers may contain siloxane blocks and oxyalkylene blocks in any relative amounts. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 50 parts by weight of the siloxane blocks and from 50 parts by weight to 95 parts by weight of the oxyalkylene blocks per 100 parts by weight of the copolymer.

The copolymers may contain more than one of each of the blocks and the blocks may be arranged in various configurations such as linear, cyclic or branched configurations.

The most preferred block co-polymers have the general formula III

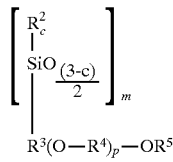

$$\left[\begin{array}{c} R^2_c \\ | \\ SiO_{\frac{(3-c)}{2}} \\ | \\ R^3(O-R^4)_p-OR^5 \end{array}\right]_m \qquad III$$

wherein p represents a number>2 and preferably represents a number in the range of 4 to 30, c represents an integer in the range of 0 to 2, m represents a number$\geq 2$, $R^2$ represents a monovalent hydrocarbyl radical of 1 to 12 carbon atoms preferably a linear aliphatic radical for example a methyl or ethyl group, $R^3$ represents a divalent hydrocarbyl radical of 1 to 12 carbon atoms preferably an alkylene group of at least two carbon atoms for example ethylene, 1,3-propylene or 1,4-butylene, $R^4$ represents the same or different divalent hydrocarbyl radicals of 2 to 10 carbon atoms such as for example ethylene, 1,3-propylene or 1,6-hexylene, and $R^5$ represents a monovalent hydrocarbyl group of 1 to 12 carbon atoms or an end-group such as for example hydroxyl or hydrogen. It is preferred that $R^4$ represents different hydrocarbyl radicals and most preferably represents a mixture of at least one of each of ethylene and 1,3-propylene radicals.

The above-described block copolymers may be produced by an addition reaction between siloxanes containing silicon-bonded hydrogen atoms and oxyalkylene polymers containing alkenyl end-blocking groups in the presence of a platinum catalyst. These copolymers can also be prepared by a metathesis reaction between siloxanes containing silicon-bonded chloro-organo groups and an alkaline metal salt of a hydroxy end-blocked oxyalkylene polymer.

ASHLESS DISPERSANT

In accordance with the first, second, third and fourth aspects of the invention, any of the ashless dispersants which contain nitrogen and which are known in the art for use in lubricants and fuels may be utilized with the antifoam agents of the present invention. Such ashless dispersants include:

(i) acylated nitrogen-containing compounds having a substituent of at least 10 aliphatic carbon atoms, made by reacting a carboxylic acid acylating agent with at least one amine compound containing at least one —NH— group, said acylating agent being linked to said amino compound through an imido, amido, amidine or acyloxy ammonium linkage;

(ii) hydrocarbyl-substituted amines and/or polyamines containing at least one —NH— or —N group wherein at least one hydrocarbyl substituent is substantially aliphatic and contains at least 8 carbon atoms;

(iii) nitrogen-containing condensates of a phenol, aldehyde and amino compound having at least one —NH— group;

(iv) polymer nitrogen-containing dispersants;

(v) fuel soluble alkoxylated derivatives of amines.

The preferred compatibilisers are the acylated nitrogen-containing compounds (i).

A number of acylated, nitrogen-containing compounds having a hydrocarbyl substituent of at least 10 carbon atoms and made by reacting a carboxylic acid acylating agent, for example an anhydride or ester, with an amino compound are known to those skilled in the art. In such compositions the acylating agent is linked to the amino compound through an imido, amido, amidine or acyloxy ammonium linkage. The hydrocarbyl substituent of at least 10 carbon atoms may be found either in the portion of the molecule derived from the carboxlyic acid acylating agent, or in the portion derived from the amino compound, or in both. Preferably, however, it is found in the acylating agent portion. The acylating agent can vary from formic acid and its acylating derivatives to acylating agents having high molecular weight hydrocarbyl substituents of up to 5000, 10000 or even 20000 carbon atoms. The amino compounds can vary from ammonia itself to amines having hydrocarbyl substituents of up to about 30 carbon atoms.

The ashless dispersant may comprise a hydrocarbyl-substituted succinimide or succinamide or both of number-average molecular weight in the range of 500 to 2,000.

A preferred class of acylated amino compounds are those made by reacting an acylating agent having a hydrocarbyl substituent of at least 10 carbon atoms and a nitrogen compound characterized by the presence of at least one —NH— group. Typically, the acylating agent will be a mono- or polycarboxylic acid (or reactive equivalent thereof) such as a substituted succinic or propionic acid and the amino compound will be a polyamine or mixture of polyamines, most typically, a mixture of ethylene polyamines. The amine also may be a hydroxyalkyl-substituted polyamine. The hydrocarbyl substituent in such acylating agents preferably averages at least about 30 or 50 and up to about 400 carbon atoms.

Illustrative of hydrocarbyl substituent groups containing at least 10 carbon atoms are n-decyl, n-dodecyl, tetrapropenyl, n-octadecyl, oleyl, chlorooctadecyl, triicontanyl, etc. Generally, the hydrocarbyl substituents are made from homo- or interpolymers (e.g. copolymers, terpolymers) of mono- and di-olefins having 2 to 10 carbon atoms, such as ethylene, propylene, butene-1, isobutene, butadiene, isoprene, 1-hexene, 1-octene, etc. Typically, these olefins are 1-monoolefins. This substituent can also be derived from the halogenated (e.g chlorinated or brominated) analogs of such homo- or interpolymers. The substituent can, however, be made from other sources such as monomeric high molecular weight alkenes (e.g. 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g. poly(ethylene) greases) and other sources known to those skilled in the art. Any unsaturation in the substituent may be reduced or eliminated by hydrogenation according to procedures known in the art.

The term hydrocarbyl denotes a group having a carbon atom directly attached to the remainder of the molecule and which has a predominantly aliphatic hydrocarbon character. Therefore, hydrocarbyl substituents can contain up to one non-hydrocarbyl group for every 10 carbon atoms provided that this non-hydrocarbyl group does not significantly alter the predominantly aliphatic hydrocarbon character of the group. Those skilled in the art will be aware of such groups, which include, for example, hydroxyl, halo (especially chloro and fluoro), alkoxyl, alkyl mercapto, alkyl sulfoxy, etc. Usually, however, the hydrocarbyl substituents are purely aliphatic hydrocarbon in character and do not contain such groups.

The hydrocarbyl substituents are predominantly saturated, that is, they contain no more than one carbon-tocarbon unsaturated bond for every 10 carbon-to-carbon single bonds present. Usually, they contain no more than one carbon-to-carbon non-aromatic unsaturated bond for every 50 carbon-to-carbon bonds present.

The hydrocarbyl substituents are also predominantly aliphatic in nature, that is, they contain no more than one non-aliphatic moiety (cycloalkyl, cycloalkenyl or aromatic) group of 6 or less carbon atoms for every 10 carbon atoms in the substituent. Usually, however, the substituents contain no more than one such non-aliphatic group for every 50 carbon atoms, and in many cases, they contain no such non-aliphatic groups at all; that is, the typically substituents are purely aliphatic. Typically, these purely aliphatic substituents are alkyl or alkenyl groups.

Specific examples of the predominantly saturated hydrocarbyl substituents containing an average of more than 30 carbon atoms are the following: a mixture of poly(ethylene/propylene) groups of about 35 to about 70 carbon atoms; a mixture of poly(propylene/1-hexene) groups of about 80 to about 150 carbon atoms; a mixture of poly(isobutene) groups having an average of 50 to 75 carbon atoms; a mixture of poly (1-butene) groups having an average of 50–75 carbon atoms.

A preferred source of the substituents are poly(isobutene)s obtained by polymerization of a $C_4$ refinery stream having a butene content of 35 to 75 weight percent and isobutene content of 30 to 60 weight percent in the presence of a Lewis acid catalyst such as aluminum trichloride or boron trifluoride. These polybutenes predominantly contain monomer repeating units of the configuration

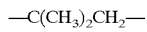

—C(CH$_3$)$_2$CH$_2$—

Examples of amino compounds useful in making these acylated compounds are the following:

(1) polyalkylene polyamines of the general formula IV

(R$^6$)$_2$N[U—N(R$^6$)]$_q$(R$^6$)$_2$    IV wherein each $R^6$ independently represents a hydrogen atom, a hydrocarbyl group or a hydroxy-substituted hydrocarbyl group containing up to about 30 carbon atoms, with the proviso that at least one $R^6$ represents a hydrogen atom, q represents an integer in the range from 1 to 10 and U represents a $C_{1-18}$ alkylene group;

(2) heterocyclic-substituted polyamines including hydroxyalkyl-substituted polyamines wherein the polyamines are described above and the heterocyclic substituent is for example a piperazine, an imidazoline, a pyrimidine, or a morpholine, and (3) aromatic polyamines of the general formula V

Ar(NR$^6_2$)$_y$    V wherein Ar represents an aromatic nucleus of 6 to about 20 carbon atoms, each $R^6$ is as defined hereinabove and y represents a number from 2 to about 8.

Specific examples of the polyalkylene polyamines (1) are ethylene diamine, tetra(ethylene)pentamine, tri-(trimethylene)tetramine, and 1,2-propylene diamine. Specific examples of hydroxyalkyl-substituted polyamines include N-(2-hydroxyethyl) ethylene diamine, N,N$^1$-bis-(2-hydroxyethyl) ethylene diamine, N-(3-hydroxybutyl) tetramethylene diamine, etc. Specific examples of the heterocyclic-substituted polyamines (2) are N-2-aminoethyl piperazine, N-2 and N-3 amino propyl morpholine, N-3-(dimethyl amino) propyl piperazine, 2-heptyl-3-(2-aminopropyl) imidazoline, 1,4-bis (2-aminoethyl) piperazine, 1-(2-hydroxy ethyl) piperazine, and 2-heptadecyl-1-(2-hydroxyethyl)-imidazoline, etc. Specific examples of the aromatic polyamines (3) are the various isomeric phenylene diamines, the various isomeric naphthalene diamines, etc.

Many patents have described useful acylated nitrogen compounds including U.S. Pat. Nos. 3,172,892; 3,219,666; 3,272,746; 3,310,492; 3,341,542; 3,444,170; 3,455,831; 3,455,832; 3,576,743; 3,630,904; 3,632,511; 3,804,763 and 4,234,435, and including European patent applications EP 0 336 664 and EP 0 263 703. A typical and preferred compound of this class is that made by reacting a poly (isobutylene)-substituted succinic anhydride acylating agent (e.g. anhydride, acid, ester, etc) wherein the poly(isobutene) substituent has between about 50 to about 400 carbon atoms with a mixture of ethylene polyamines having 3 to about 7 amino nitrogen atoms per ethylene polyamine and about 1 to about 6 ethylene groups. The art contains extensive disclosure of this type of acylated amino compound; the above-noted US patents are referred to for their disclosure of acylated amino compounds and their method of preparation.

Another type of acylated nitrogen compound belonging to this class is that made by reacting the afore-described alkylene amines with the afore-described substituted succinic acids or anhydrides and aliphatic mono-carboxylic acids having from 2 to about 22 carbon atoms. In these types of acylated nitrogen compounds, the mole ratio of succinic acid to mono-carboxylic acid ranges from about 1:0.1 to about 1:1. Typical of the mono-carboxylic acid are formic acid, acetic acid, dodecanoic acid, butanoic acid, oleic acid, stearic acid, the commercial mixture of stearic acid isomers known as isosteric acid, tolyl acid, etc. Such materials are more fully described in U.S. Pat. Nos. 3,216,936 and 3,250,715.

Still another type of useful acylated nitrogen compound is the product of the reaction of a fatty monocarboxylic acid of about 12–30 carbon atoms and the afore-described alkylene amines, typically, ethylene, propylene or trimethylene polyamines containing 2 to 8 amino groups and mixtures thereof. The fatty mono-carboxylic acids are generally mixtures of straight and branched chain fatty carboxylic acids containing 12–30 carbon atoms. A widely used type of acylating nitrogen compound is made by reacting the afore-described alkylene polyamines with a mixture of fatty acids having from 5 to about 30 mole percent straight chain acid and about 70 to about 95 mole percent branched chain fatty acids. Among the commercially available mixtures are those known widely in the trade as isostearic acid. These mixtures are produced as by-product from the dimerization of unsaturated fatty acids as described in U.S. Pat. Nos. 2,812,342 and 3,260,671.

The branched chain fatty acids can also include those in which the branch is not alkyl in nature, such as found in phenyl and cyclohexyl stearic acid and the chloro-stearic acids. Branched chain fatty carboxylic acid/alkylene polyamine products have been described extensively in the art. See for example, U.S. Pat. Nos. 3,110,673; 3,251,853; 3,326,801; 3,337,459; 3,405,064; 3,429,674; 3,468,639; 3,857,791. These patents are utilized for their disclosure of fatty acid-polyamine condensates for their use in oleaginous formulations.

The most preferred acylated nitrogen-containing compounds are those made by reacting a poly(isobutene) substituted succinic anhydride acylating agent with mixtures of ethylene polyamines, as hereinbefore described.

It is preferred that the weight of nitrogen present within the ashless dispersant in the additive composition of the first aspect and in the use of the fourth aspect be in the range of 8.5% to 90% of the total weight of the antifoam agent, and more preferably in the range of 9% to 80%. Whilst the minimum level of nitrogen appears to be the key technical parameter supplying the compatibilising effect, in practice a maximum level of nitrogen will be dictated by economic considerations and personal preference.

Ashless dispersants useful in accordance with the fifth aspect of the invention are those (i) to (v) inclusive hereinbefore described which contain at least one primary amine group. More preferred are those ashless dispersants identified as preferred embodiments of the first, second, third or fourth aspects of the invention which contain at least one primary amine group.

HYDROCARBON OIL

The hydrocarbon oil may be a crude oil, i.e. oil obtained directly from drilling and before refining.

The oil may be a monograde or multigrade lubricating oil which may be based on a mineral oil, such as one or more petroleum oil fractions ranging from naphthas or spindle oil to SAE 30, 40 or 50 lubricating oil grades, or oxidised mineral oil. Such an oil may contain additives depending on its intended use.

The oil may be fuel oil, such as petroleum-based fuel oil, suitably a middle distillate fuel oil, i.e. a fuel oil obtained in refining crude oil as the fraction between the lighter kerosene and jet fuels fraction and the heavier fuel oil fraction. Such distillate fuel oils generally boil within the range of about 100° C. to about 500° C. (ASTM D1160), e.g. 150° C. to about 400° C., for example, those having a relatively high Final Boiling Point of above 360° C., such as 380° C. The fuel oil can comprise atmospheric distillate or vacuum distillate, or cracked gas oil or a blend in any proportion of straight run and thermally and/or catalytically cracked distillates.

The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both. Heating oils may be made of a blend of virgin distillate, e.g. gas oil, naphtha, etc and cracked distillates, e.g. catalytic cycle shock. A representative specification for a diesel fuel includes a minimum flash point of 38° C. and a 90% distillation point between 282° and 380° C. (see ASTM Designations D-396 and D-975).

The fuel oil may have a sulphur concentration of 1% by weight or less based on the weight of the fuel. Preferably, the sulphur concentration is 0.05% by weight or less, more preferably 0.005% by weight or less, and most preferably 0.001% by weight or less. The art describes methods for reducing the sulphur concentration of hydrocarbon middle distillate fuels, such methods including solvent extraction, sulphuric acid treatment, and hydrodesulphurisation.

The oil may be one or more oils obtained from animal or vegetable material or both, or derivatives thereof.

Oils obtained from animal or vegetable material are mainly metabolites comprising triglycerides of monocarboxylic acids, e.g. acids containing mainly 10–25 carbon atoms and of the form:

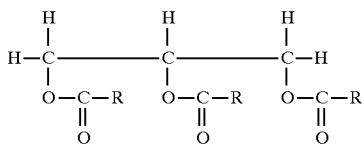

where R represents an aliphatic radical of predominantly 10–25 carbon atoms which may be saturated or unsaturated. Preferably, R is an alphatic radical of 10–25 carbons. Generally, such oils contain glycerides of a number of acids, the number and kind varying with the source of the oil, and may additionally contain phosphoglycerides. Such oils may be obtained by methods known in the art.

Examples of derivatives of such oils are alkyl esters, such as methyl esters, of fatty acids of the vegetable or animal oils. Such esters can be made by transesterification.

Reference within this specification to oils that are derived from animal or vegetable material therefore includes reference both to oils obtained from said animal or vegetable material or both, or to derivatives thereof.

Examples of oils derived from animal or vegetable material are rapeseed oil, coriander oil, soyabean oil, cottonseed oil, sunflower oil, castor oil, olive oil, peanut oil, maize oil, almond oil, palm kernel oil, coconut oil, mustard seed oil, beef tallow and fish oils. Further examples include oils derived from corn, jute, sesame, shea nut, ground nut and linseed and may be derived therefrom by methods known in the art. Rapeseed oil, which is a mixture of fatty acids partially esterified with glycerol, is preferred as it is available in large quantities and can be obtained in a simple way by pressing from rapeseed.

As lower alkyl esters of fatty acids, consideration may be given to the following, for example as commercial mixtures: the ethyl, propyl, butyl and especially methyl esters of fatty acids with 12 to 22 carbon atoms, for example of lauric acid, myristic acid, palmitic acid, palmitoleic acid, stearic acid, oleic acid, elaidic acid, petroselic acid, ricinoleic acid, elaeostearic acid, linoleic acid, linolenic acid, eicosanoic acid, gadoleic acid, docosanoic acid or erucic acid, which have an iodine number from 50 to 150, especially 90 to 125. Mixtures with particularly advantageous properties are those which contain mainly, i.e. to at least 50 wt % methyl esters of fatty acids with 16 to 22 carbon atoms and 1, 2 or 3 double bonds. The preferred lower alkyl esters of fatty acids are the methyl esters of oleic acid, linoleic acid, linolenic acid and erucic acid.

Commercial mixtures of the stated kind are obtained for example by cleavage and esterification of animal and vegetable fats and oils by their transesterification with lower aliphatic alcohols. For production of lower alkyl esters of fatty acids it is advantageous to start from fats and oils with high iodine number, such as, for example, sunflower oil, rapeseed oil, coriander oil, castor oil, soyabean oil, cottonseed oil, peanut oil or beef tallow. Lower alkyl esters of fatty acids based on a new variety of rapeseed oil, the fatty acid component of which is derived to more than 80 wt % from unsaturated fatty acids with 18 carbon atoms, are preferred.

Particularly preferred are oils according to this invention capable of being utilised as biofuels. A biofuel is an oil obtained from vegetable or animal material or both, or a derivative thereof, capable of being utilised as a fuel. Biofuels are believed to be less damaging to the environment and are obtained from a renewable source. It has been reported that on combustion less sulphur dioxide is formed than is formed by the equivalent quantity of petroleum distillate fuel, e.g. diesel fuel. Certain derivatives of vegetable oil, e.g. those obtained by saponification and re-esterification with a monohydric alkyl alcohol, may be used as a substitute for diesel fuel.

Mixtures of one or more biofuels with petroleum distillate fuels are also particularly preferred. The proportion of biofuel in such a mixture may range from 0.1% to 90% by weight. It has recently been reported that mixtures of a rapeseed ester, for example, rapeseed oil methyl ester (RME), with petroleum distillate fuels in ratios of, for example, 10:90 by volume are likely to be commercially available in the near future.

Although many of the above oils may be used as biofuels, preferred are vegetable oils or derivatives thereof, of which particularly preferred biofuels are rapeseed oil, cottonseed oil, soyabean oil, sunflower oil, olive oil, palm oil, or alkyl ester derivatives thereof, rapeseed oil methyl ester being especially preferred.

The oils derived from animal or vegetable material may also contain other additives such as low temperature flow improvers, stabilisers, dispersants, antioxidants, corrosion inhibitors,cetane improvers and/or demulsifiers.

TREAT RATES

In accordance with the fifth aspect, the concentration of the primary amine-containing ashless dispersant(s) in the hydrocarbon oil may for example be in the range of 1 to 5,000 ppm of additive (active ingredient) by weight per weight of fuel, for example 10 to 5,000 ppm such as 10 to 2000 ppm (active ingredient) by weight per weight of fuel, preferably 15 to 500 ppm, more preferably 15 to 300 ppm. The additive or additives should be soluble in the oil to the extent of at least 1000 ppm by weight per weight of oil at ambient temperature.

In accordance with the first, second, third and fourth aspects, the concentration range of the ashless dispersant may correspond to that of the compounds according to the fifth aspect, provided always that the appropriate minimum quantity of nitrogen is supplied to compatibilise the antifoam.

In accordance with all aspects, the concentration of the antifoam may for example be in the range of 0.1–100 ppm, preferably 0.5–50 ppm, more preferably 1–20 ppm and most preferably 2–10 ppm (active ingredient) by weight per weight of fuel.

CONCENTRATE

Concentrates of the third aspect are convenient as a means for incorporating, into bulk oil, additives according to the first aspect. Incorporation may be by methods known in the art. The concentrates may also contain other additives as required and preferably contain from 3 to 75 wt %, more preferably 3 to 60 wt %, most preferably 10 to 50 wt % of the additives preferably in solution in oil. Examples of carrier liquid are organic solvents including hydrocarbon solvents, for example petroleum fractions such as naphtha, kerosene, diesel and heater oil; aromatic hydrocarbons such as aromatic fractions, e.g. those sold under the 'SOLVESSO' trade name; paraffinic hydrocarbons such as hexane and pentane and isoparaffins; alcohols; esters; and mixtures of one or more of the above. The carrier liquid must, of course, be selected having regard to its compatibility with the additives and with the fuel.

The additives of the invention may be incorporated into bulk oil by other methods such as those known in the art. Co-additives may be incorporated into the bulk oil at the same time as the additives of the invention or at a different time. Likewise, the components (a) and (b) of the additives of the invention may be incorporated into the bulk oil at the same time or at a different time, to form the fuels of the invention.

CO-ADDITIVES

The additives of the invention may be used singly or more preferably in combination with one or more co-additives such as known in the art. When the hydrocarbon oil comprises a lubricating oil the other additives may include, alone or in combination, viscosity modifiers, corrosion inhibitors, oxidation inhibitors, friction modifiers, lubricity agents, pour point depressants, detergents, combustion improvers or rust inhibitors.

When the hydrocarbon oil comprises a fuel oil the other additives may comprise one or more antioxidants, corrosion inhibitors, dehazers, demulsifiers, metal deactivators, cetane improvers, cosolvents, package compatibilisers, reodorants, combustion improvers, lubricity additives and antistatic additives.

The additives of the invention may be used in combination with one or more co-additives which improve the cold flow properties of distillate fuels, for example the additives listed under (i) to (vii) below.

(i) Comb Polymers

Comb polymers are polymers in which hydrocarbyl groups are pendant from a polymer backbone and are discussed in "Comb-Like Polymers. Structure and Properties", N. A. Platé and V. P. Shibaev, J. Poly. Sci. Macromolecular Revs., 8, p 117 to 253 (1974).

Advantageously, the comb polymer is a homopolymer having side chains containing at least 6, and preferably at least 10, carbon atoms or a copolymer having at least 25 and preferably at least 40, more preferably at least 50, molar percent of units having side chains containing at least 6, and preferably at least 10, carbon atoms.

As examples of preferred comb polymers there may be mentioned those of the general formula

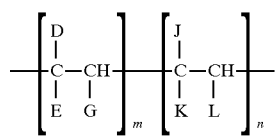

where
D=$R^{11}$, $COOR^{11}$, $OCOR^{11}$, $R^{12}COOR^{11}$ or $OR^{11}$
E=H, $CH_3$, D or $R^{12}$
G=H or D
J=H, $R^{12}$, $R^{12}COOR^{11}$, or an aryl or heterocyclic group
K=H, $COOR^{12}$, $OCOR^{12}$, $OR^{12}$ or COOH
L=H, $R^{12}$, $COOR^{12}$, $OCOR^{12}$ or aryl
$R^{11} \geq C_{10}$ hydrocarbyl
$R^{12} \geq C_1$ hydrocarbyl
and m and n represent mole ratios, m being within the range of from 1.0 to 0.4, n being in the range of from 0 to 0.6. $R^{11}$ advantageously represents a hydrocarbyl group with from 10 to 30 carbon atoms, and $R^{12}$ advantageously represents a hydrocarbyl group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g. an α-olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerized with e.g. maleic anhydride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpentadecan-1-ol, 2-methyltridecan-1-ol. The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be fumarate or itaconate polymers and copolymers such as for example those described in European Patent Applications 153 176, 153 177 and 225 688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight. The particularly preferred fumarate comb polymers may, for example, have a number average molecular weight in the range of 1,000 to 100,000, preferably 1,000 to 30,000, as measured by Vapour Phase Osmometry (VPO).

Other suitable comb polymers are the polymers and copolymers of α-olefins and esterified copolymers of styrene and maleic anhydride, and esterified copolymers of styrene and fumaric acid; mixtures of two or more comb polymers may be used in accordance with the invention and, as indicated above, such use may be advantageous.

(ii) Polyoxyalkylene Compounds

Examples are polyoxyalkylene esters, ethers, ester/ethers and mixtures thereof, particularly those containing at least one, preferably at least two $C_{10}$ to $C_{30}$ linear saturated alkyl groups and a polyoxyalkylene glycol group of molecular weight up to 5,000 preferably 200 to 5,000, the alkyl group in said polyoxyalkylene glycol containing from 1 to 4 carbon atoms. These materials form the subject of European Patent Publication 0 061 895 A2. Other such additives are described in U.S. Pat. No. 4,491,455.

The preferred esters, ethers or ester/ethers which may be used may be structurally depicted by the formula

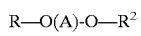

where R and $R^2$ are the same or different and may be (a) n-alkyl (b) 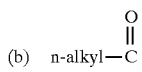

(c) 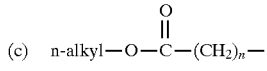

(d) 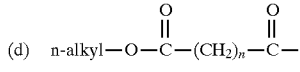

n being, for example, 1 to 30, the alkyl group being linear and saturated and containing 10 to 30 carbon atoms, and A representing the polyalkylene segment of the glycol in which the alkylene group has 1 to 4 carbon atoms, such as a polyoxymethylene, polyoxyethylene or polyoxytrimethylene moiety which is substantially linear; some degree of branching with lower alkyl side chains (such as in polyoxypropylene glycol) may be present but it is preferred that the glycol is substantially linear. A may also contain nitrogen.

Examples of suitable glycols are substantially linear polyethylene glycols (PEG) and polypropylene glycols (PPG) having a molecular weight of about 100 to 5,000, preferably about 200 to 2,000. Esters are preferred and fatty acids containing from 10–30 carbon atoms are useful for reacting with the glycols to form the ester additives, it being preferred to use a $C_{18}$–$C_{24}$ fatty acid, especially behenic acid. The esters may also be prepared by esterifying polyethoxylated fatty acids or polyethoxylated alcohols.

Polyoxyalkylene diesters, diethers, ether/esters and mixtures thereof are suitable as additives, diesters being preferred for use in narrow boiling distillates when minor amounts of monoethers and monoesters (which are often formed in the manufacturing process) may also be present. It is important for additive performance that a major amount of the dialkyl compound is present. In particular, stearic or behenic diesters of polyethylene glycol, polypropylene glycol or polyethylene/polypropylene glycol mixtures are preferred.

Other examples of polyoxyalkylene compounds are those described in Japanese Patent Publication Nos 2-51477 and 3-34790 (both Sanyo), and the esterfied alkoxylated amines described in EP-A-117,108 and EP-A-326,356 (both Nippon Oil and Fats).

(iii) Ethylene/Unsaturated Ester Copolymers

Ethylene copolymer flow improvers have a polymethylene backbone divided into segments by oxyhydrocarbon side chains, i.e. ethylene unsaturated ester copolymer flow improvers. The unsaturated monomers copolymerisable with ethylene to form the copolymers include unsaturated mono and diesters of the genereal formula:

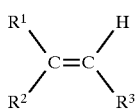

wherein $R^1$ represents hydrogen or a methyl group;

$R^2$ represents a —OOCR$^4$ or —COOR$^4$ group wherein $R^4$ represents hydrogen or a $C_1$ to $C_8$, straight or branched chain alkyl group, provided that $R^4$ does not represent hydrogen when $R^2$ represents —COOR$^4$; and $R^3$ is hydrogen or —COOR$^4$.

The monomer, when $R^2$ and $R^3$ are hydrogen and $R^1$ is —OOCR$^4$, includes vinyl alcohol esters of $C_1$ to $C_5$ monocarboxylic acids. Examples of vinyl esters which may be copolymerised with ethylene include vinyl acetate, vinyl propionate and vinyl butyrate or isobutyrate, vinyl acetate and vinyl propionate being preferred. Preferably, the copolymers contain from 5 to 40 wt % of the vinyl ester, more preferably from 10 to 35 wt % vinyl ester. They may also be in the form of mixtures of two copolymers such as those described in U.S. Pat. No. 3,961,916. Preferably, number average molecular weight, as measured by vapour phase osmometry, of the copolymer is 1,000 to 10,000, more preferably 1,000 to 5,000. If desired, the copolymers may be derived from additional comonomers, e.g. they may be terpolymers or tetrapolymers or higher polymers, for example where the additional comonomer is isobutylene or diisobutylene.

Such copolymers may also be made by transesterification, or by hydrolysis and re-esterification, of an ethylene unsaturated ester copolymer to give a different ethylene unsaturated ester copolymer. For example, ethylene vinyl hexanoate and ethylene vinyl octanoate copolymers may be made in this way, e.g. from an ethylene vinyl acetate copolymer.

(iv) Polar Organic, Nitrogen-Containing Compounds

The oil-soluble polar nitrogen compound is either ionic or non-ionic and is capable of acting as a wax crystal growth inhibitor in fuels. It comprises for example one or more of the compounds (a) to (c) as follows:

(a) An amine salt and/or amide formed by reacting at least one molar proportion of a hydrocarbyl substituted amine with a molar proportion of a hydrocarbyl acid having 1 to 4 carboxylic acid groups or its anhydride.

Ester/amides may be used containing 30 to 300, preferably 50 to 150 total carbon atoms. These nitrogen compounds are described in U.S. Pat. No. 4,211,534. Suitable amines are usually long chain $C_{12}$–$C_{40}$ primary, secondary, tertiary or quaternary amines or mixtures thereof but shorter chain amines may be used provided the resulting nitrogen compound is oil soluble and therefore normally contains about 30 to 300 total carbon atoms. The nitrogen compound preferably contains at least one straight chain $C_8$ to $C_{40}$, preferably $C_{14}$ to $C_{24}$, alkyl segment.

Suitable amines include primary, secondary, tertiary or quaternary, but preferably are secondary. Tertiary and quaternary amines can only form amine salts. Examples of amines include tetradecyl amine, cocoamine, and hydrogenated tallow amine. Examples of secondary amines include dioctacedyl amine and methyl-behenyl amine. Amine mixtures are also suitable such as those derived from natural materials. A preferred amine is a secondary hydrogenated tallow amine of the formula HNR$^1$R$^2$ wherein R$^1$ and R$^2$ are alkyl groups derived from hydrogenated tallow fat composed of approximately 4% $C_{14}$, 31% $C_{16}$, 59% $C_{18}$.

Examples of suitable carboxylic acids and their anhydrides for preparing the nitrogen compounds include cyclohexane 1,2 dicarboxylic acid, cyclohexene 1,2 dicarboxylic acid, cyclopentane 1,2 dicarboxylic acid and naphthalene dicarboxylic acid, and 1,4-dicarboxylic acids including dialkyl spirobislactone. Generally, these acids have about 5–13 carbon atoms in the cyclic moiety. Preferred acids useful in the present invention are benzene dicarboxylic acids such as phthalic acid, isophthalic acid, and terephthalic acid. Phthalic acid or its anhydride is particularly preferred. The particularly preferred compound is the amide-amine salt formed by reacting 1 molar portion of phthalic anhydride with 2 molar portions of dihydrogenated tallow amine. Another preferred compound is the diamide formed by dehydrating this amide-amine salt.

Other examples are long chain alkyl or alkylene substituted dicarboxylic acid derivatives such as amine salts of monoamides of substituted succinic acids, examples of which are known in the art and described in U.S. Pat. No. 4,147,520, for example. Suitable amines may be those described above.

Other examples are condensates such as described in EP-A-327,423.

(b) A chemical compound comprising or including a cyclic ring system, the compound carrying at least two substituents of the general formula (I) below on the ring system

where A is an aliphatic hydrocarbyl group that is optionally interrupted by one or more hetero atoms and that is straight chain or branched, and R$^1$ and R$^2$ are the same or different and each is independently a hydrocarbyl group containing 9 to 40 carbon atoms optionally interrupted by one or more hetero atoms, the substituents being the same or different and the compound optionally being in the form of a salt thereof.

Preferably, A has from 1 to 20 carbon atoms and is preferably a methylene or polymethylene group Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulphur, and, preferably, oxygen.

The cyclic ring system may include homocyclic, heterocyclic, or fused polycyclic assemblies, or a system where two or more such cyclic assemblies are joined to one another and in which the cyclic assemblies may be the same or different. Where there are two or more such cyclic assemblies, the substituents of the general formula (I) may be on the same or different assemblies, preferably on the same assembly. Preferably, the or each cyclic assembly is aromatic, more preferably a benzene ring. Most preferably, the cyclic ring system is a single benzene ring when it is preferred that the substituents are in the ortho or meta positions, which benzene ring may be optionally further substituted.

The ring atoms in the cyclic assembly or assemblies are preferably carbon atoms but may for example include one or more ring N, S or O atom, in which case or cases the compound is a heterocyclic compound.

Examples of such polycyclic assemblies include:

(i) condensed benzene structures such as naphthalene, anthracene, phenanthrene, and pyrene;

(ii) condensed ring structures where none of or not all of the rings are benzene such as azulene, indene, hydroindene, fluorene, and diphenylene oxide;

(iii) rings joined "end-on" such as diphenyl;

(iv) heterocyclic compounds such as quinoline, indole, 2:3 dihydroindole, benzofuran, coumarin, isocoumarin, benzothiophen, carbazole and thiodiphenylamine;

(v) non-aromatic or partially saturated ring systems such as decalin (i.e. decahydronaphthalene), α-pinene, cardinene, and bornytene; and (vi) three-dimensional structures such as norbornene, bicycloheptane (i.e. norbornane), bicyclooctane, and bicyclooctene.

Each hydrocarbyl group constituting R$^1$ and R$^2$ in the invention (Formula I) may for example be an alkyl or alkylene group or a mono- or poly-alkoxyalkyl group. Preferably, each hydrocarbyl group is a straight chain alkyl group. The number of carbon atoms in each hydrocarbyl group is preferably 16 to 40, more preferably 16 to 24.

Also, it is preferred that the cyclic system is substituted with only two substituents of the general formula (I) and that A is a methylene group.

Examples of salts of the chemical compounds are the acetate and the hydrochloride.

The compounds may conveniently be made by reducing the corresponding amide which may be made by reacting a secondary amine with the appropriate acid chloride; and (c) A condensate of long chain primary or secondary amine with a carboxylic acid-containing polymer.

Specific examples include polymers such as described in GB-A-2,121,607, FR-A-2,592,387 and DE-A-3,941,561; and also esters of telemer acid and alkanoloamines such as described in U.S. Pat. No. 4,639,256; a long chain epoxide/amine reaction product which may optionally be further reacted with a polycarboxylic acid; and the reaction product of an amine containing a branched carboxylic acid ester, an epoxide and a mono-carboxylic acid polyester such as described in U.S. Pat. No. 4,631,071.

v) Hydrocarbon Polymers

Examples are those represented by the following general formula

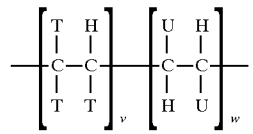

where

T=H or $R^1$

U=H, T or aryl $R^1 = C_1-C_{30}$ hydrocarbyl and v and w represent mole ratios, v being within the range 1.0 to 0.0, w being within the range 0.0 to 1.0.

These polymers may be made directly from ethylenically unsaturated monomers or indirectly by hydrogenating the polymer made from monomers such as isoprene and butadiene.

Preferred hydrocarbon polymers are copolymers of ethylene and at least one α-olefin, having a number average molecular weight of at least 30,000. Preferably the α-olefin has at most 20 carbon atoms. Examples of such olefins are propylene, 1-butene, isobutene, n-octene-1, isooctene-1, n-decene-1, and n-dodecene-1. The copolymer may also comprise small amounts, e.g. up to 10% by weight of other copolymerizable monomers, for example olefins other than α-olefins, and non-conjugated dienes. The preferred copolymer is an ethylene-propylene copolymer. It is within the scope of the invention to include two or more different ethylene-α-olefin copolymers of this type.

The number average molecular weight of the ethylene-α-olefin copolymer is, as indicated above, at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 percent. More advantageously, the ethylene content is within the range of from 57 to 80%, and preferably it is in the range from 58 to 73%; more preferably from 62 to 71%, and most preferably 65 to 70%.

Preferred ethylene-α-olefin copolymers are ethylene-propylene copolymers with a molar ethylene content of from 62 to 71% and a number average molecular weight in the range 60,000 to 120,000, especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. Advantageously, the polymers are substantially amorphous, since highly crystalline polymers are relatively insoluble in fuel oil at low temperatures.

The additive composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar percent although for ethylene-propylene copolymers up to 86 molar percent by weight ethylene may be employed with advantage.

Examples of hydrocarbon polymers are described in WO-A-9 111 488.

(vi) Sulphur Carboxy Compounds

Examples are those described in EP-A-0,261,957 which describes the use of compounds of the general formula

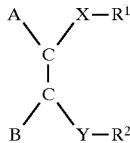

in which

—Y—$R^2$ is $SO_3^{(-)(+)}NR_3^3R^2$, —$SO_3^{(-)(+)}HNR_2^3R^2$,
—$SO_3^{(-)(+)}H_2NR^3R^2$, —$SO_3^{(-)(+)}H_3NR^2$,
—$SO_2NR^3R^2$ or —$SO_3R^2$;
—X—$R^1$ is —Y—$R^2$ or —$CONR^3R^1$,
—$CO_2^{(-)(+)}NR_3^3R^1$, —$CO_2^{(-)(+)}HNR_2^3R^1$,
—$R^4$—$COOR_1$, —$NR^3COR^1$,
—$R^4OR^1$, —$R^4OCOR^1$, —$R^4,R^1$,
—$N(COR^3)R^1$ or $Z^{(-)(+)}NR_3^3R^1$;
—$Z^{(-)}$ is $SO_3^{(-)}$ or —$CO_2^{(-)}$;

$R^1$ and $R^2$ are alkyl, alkoxyalkyl or polyalkoxyalkyl containing at least 10 carbon atoms in the main chain;

$R^3$ is hydrocarbyl and each $R^3$ may be the same or different and $R^4$ is absent or is $C_1$ to $C_5$ alkylene and in

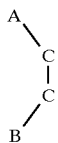

the carbon-carbon (C—C) bond is either a) ethylenically unsaturated when A and B may be alkyl, alkenyl or substituted hydrocarbyl groups or b) part of a cyclic structure which may be aromatic, polynuclear aromatic or cycloaliphatic, it is preferred that X—$R^1$ and Y—$R^2$ between them contain at least three alkyl, alkoxyalkyl or polyalkoxyalkyl groups.

(vii) Hydrocarbylated-Aromatics

These materials are condensates comprising aromatic and hydrocarbyl parts. The aromatic part is conveniently an aromatic hydrocarbon which may be unsubstituted or substituted with, for example, non-hydrocarbon substituents. Such aromatic hydrocarbon preferably contains a maximum of these substituent groups and/or three condensed rings, and is preferably naphthalene. The hydrocarbyl part is a hydrogen and carbon containing part connected to the rest of the molecule by a carbon atom. It may be saturated or unsaturated, and straight or branched, and may contain one or more hetero-atoms provided they do not substantially affect the hydrocarbyl nature of the part. Preferably the hydrocarbyl part is an alkyl part, conveniently having more than 8 carbon atoms. The molecular weight of such condensates may, for example, be in the range of 2,000 to 200,000 such as 2,000 to 20,000, preferably 2,000 to 8,000.

Examples are known in the art, primarily as lube oil pour depressants and as dewaxing aids as mentioned hereinbefore, they may, for example, be made by condensing a halogenated wax with an aromatic hydrocarbon. More specifically, the condensation may be a Friedel-Crafts condensation where the halogenated wax contains 15 to 60, e.g. 16 to 50, carbon atoms, has a melting point of about 200° to 400° C. and has been chlorinated to 5 to 25 wt % chlorine, e.g. 10 to 18 wt %.

Another way of making similar condensates may be from olefins and the aromatic hydrocarbons.

Multicomponent additive systems may be used and the ratios of additives to be used will depend on the fuel to be treated.

The invention will now be illustrated by way of example only as follows.

EXAMPLE 1

Inhibition of Diminution in Antifoam Performance (Fifth Aspect of the Invention)

The additive compositions of Table 1 were added to a typical European middle distillate fuel oil ('Fuel 1') to give the fuel oil compositions of Table 2. Each fuel oil composition was, in a consistent manner, shaken by hand for 30 seconds during which time a foam developed at the oil-air interface. The time which elapsed from cessation of shaking to dissipation of foam was recorded as the 'foam collapse time' (FCT), a longer FCT indicating a fuel composition with greater foaming propensity. The whole shaking procedure was repeated at intervals over a 20 day period as shown in Table 2.

TABLE 1

| Additive Composition | Relative Proportions (wt/wt) | | |
|---|---|---|---|
| | A | $B_1$ | $B_2$ |
| 1 | 1 | — | — |
| 2 | 1 | 0.8 | — |
| 3 | 1 | 1.4 | — |
| 4 | 1 | 2.0 | — |
| 5 | 1 | 2.6 | — |
| 6 | 1 | 3.2 | — |
| 7 | 1 | 4.0 | — |
| 8 | 1 | 8.0 | — |
| 9 | 1 | — | 1.6 |
| 10 | 1 | — | 2.0 |
| 11 | 1 | — | 2.6 |
| 12 | 1 | — | 3.2 |
| 13 | 1 | — | 4.0 |
| 14 | 1 | — | 8.0 |

Additive A: a proprietary organo-silicon block copolymer of the class hereinbefore described as 'silicone antifoams' and commercially available for treatment of middle distillate fuel oils.

Additive $B_1$: A 45% solution in oil of a succinimide ashless dispersant being the reaction product of 1.4 equivalents of PIBSA (polyisobutenyl succinic anhydride, with polyisobutylene number average molecular weight of approximately 950, as measured by Gel Permeation Chromatography) with one equivalent of polyethylene polyamine mixture of average composition approximating to pentaethylene hexamine. The reaction product is thus believed to be a mixture of compounds predominating in the 1:1 PIBSA:polyamine adduct, a compound in which one primary amine group of each polyamine remains unreacted.

Additive $B_2$: A 45% solution in oil of a succinimide being the reaction product of 2.8 equivalents of the PIBSA of $B_1$ to one equivalent of the polyamine of $B_1$. The reaction product is thus believed not to contain significant 1:1 adduct, the PIBSA being present in excess of the stoichiometric level required to convert primary amine groups to succinimide groups.

TABLE 2

Foam Collapse Time (Fuel 1)

| Additive Composition | Additive Treat Rate (w/w) in Fuel 1 | Time (Days) | | | | |
|---|---|---|---|---|---|---|
| | | 1 | 3 | 5 | 10 | 20 |
| Fuel 1 | — | 21 | 29 | 30 | 35 | 35 |
| | | 21 20 | 30 28 | 30 29 | 36 | 34 |
| 1 | 12.5 ppm | 7 | 15 | 26 | 34 | 29 |
| | | | 15 15 | 25 26 | 30 | 38 |
| 2 | 22.5 ppm | 8 | 13 | 19 | 24 | 28 |
| | | | 12 13 | 19 19 | 24 | 24 |
| 3 | 30.5 ppm | 9 | 16 | 18 | 27 | 32 |
| | | | 15 16 | 21 15 | 26 | 27 |
| 4 | 37.5 ppm | 9 | 16 | 23 | 31 | 38 |
| | | | 16 15 | 23 23 | 30 | 31 |
| 5 | 44.5 ppm | 10 | 16 | 23 | 31 | 38 |
| | | | 16 15 | 23 23 | 30 | 31 |
| 6 | 52.5 ppm | 10 | 15 | 21 | 22 | 20 |
| | | | 13 15 | 21 20 | 22 | 22 |
| 7 | 62.5 ppm | 11 | 16 | 22 | 26 | 26 |
| | | | 15 16 | 22 21 | 24 | 27 |
| 8 | 112.5 ppm | 11 | 18 | 25 | 31 | 31 |
| | | | 16 19 | 24 26 | 30 | 32 |
| 9 | 32.5 ppm | 6 | 18 | 33 | 39 | 28 |
| | | | 15 20 | 31 35 | 37 | 41 |
| 10 | 37.5 ppm | 6 | 18 | 36 | 45 | 26 |
| | | | 15 20 | 33 38 | 42 | 48 |
| 11 | 44.5 ppm | 7 | 19 | 28 | 28 | 19 |
| | | | 17 21 | 22 33 | 26 | 30 |
| 12 | 52.5 ppm | 7 | 24 | 42 | 43 | 27 |
| | | | 22 26 | 38 46 | 39 | 47 |
| 13 | 62.5 ppm | 7 | 14 | 32 | 28 | 28 |
| | | | 10 18 | 31 32 | 25 | 31 |
| 14 | 112.5 ppm | 7 | 8 | 34 | 33 | 28 |
| | | | 7 11 | 32 36 | 30 | 35 |

All foam collapse times are in seconds. Three entries within a given box indicate the results from triplicate testing.

The results in Table 2 illustrate the importance of the ashless dispersant containing primary amine functionality. for inhibiting the diminution in antifoam performance with time. Additive Composition 1 (Additive A alone) initially demonstrates good antifoam performance, relative to the untreated Fuel 1. However, by 5 days the foam collapse time has tended towards that of the untreated Fuel 1, indicating that diminution in antifoam performance has occurred. A similar effect is observed with Additive Compositions 9 to 14 containing Additive $B_2$. In some instances, the presence of $B_2$ actually worsens the foaming propensity of the resulting fuel compositions.

In contrast, Additive Compositions 2 to 8 (containing Additive $B_1$, and hence significant primary amine functionality) significantly inhibits this diminution in antifoam performance at the 5 and 10 day stages of the test. Moreover, the magnitude of the inhibition due to $B_1$ appears largely independent of the quantity (treat-rate) of $B_1$ present.

EXAMPLE 2

Inhibition of Association with Sediment or Sludge
(First, Second, Third and Fourth Aspects of the Invention)

Additives A, $B_1$ and $B_2$ of Example 1 were added to a second typical, European middle distillate fuel oil in the proportions shown in Table 3.

TABLE 3

| Additive Composition | a ppm, w/w | $B_1$ ppm, w/w | b | $B_2$ ppm, w/w | b | Total Additive Treat Rate ppm, w/w | $\left(\frac{b}{a} \times 100\right)$ % |
|---|---|---|---|---|---|---|---|
| 1 | 12.5 | — | — | — | — | 12.5 | — |
| 15 | 12.5 | — | — | 45 | 0.55 | 57.5 | 4.4 |
| 14 | 12.5 | — | — | 100 | 1.22 | 112.5 | 9.8 |
| 7 | 12.5 | 50 | 1.13 | — | — | 62.5 | 9.0 | a weight of Additive A (in ppm).
b weight of nitrogen (in ppm) within indicated weight of Additive B (in ppm).

The propensity of the antifoam agent in each fuel composition to physically associate with sediment or sludge was evaluated using a proprietary laboratory test in which 0.1 g of finely-divided iron oxide ('rouge') was shaken with 100 ml of each fuel composition for 30 seconds in a measuring cylinder. Agglomerated, floating rouge and rouge staining of the glass surface around the fuel meniscus is indicative of the antifoam's tendency to associate with sediment or sludge in contaminated storage systems.

The results are indicated in Table 4.

TABLE 4

(Fuel 2)

| Additive Composition | Treat Rate (w/w) | Floating Rouge | Staining of Glass Surfaces |
|---|---|---|---|
| (Fuel 2) | — | None | None |
| 1 | 12.5 ppm | Extensive | Severe |
| 15 | 57.5 ppm | Present | Severe |
| 14 | 112.5 ppm | None | None |
| 7 | 62.5 ppm | None | None |

The severe association problems of Additive Composition 1 (Additive A) are completely inhibited in the presence of a nitrogen-containing ashless dispersant (Additive B) where the weight of nitrogen present within Additive B is at least 9% of the total weight of Additive A (Additive Compositions 15 and 7). The minimum level of nitrogen required or acceptable inhibition of said association is believed to be 8%.

We claim:

1. A liquid composition comprising a major proportion of a middle distillate fuel oil containing 0.1 to 100 ppm of an anti-foam agent being a copolymer having siloxane and oxyalkylene groups and a nitrogen-containing ashless dispersant having at least one primary amine group and being selected from the group consisting of acylated nitrogen-containing compounds, hydrocarbyl substituted amines or polyamines, nitrogen containing condensates of a phenol aldehyde and an amino compound having at least one —NH— group, polymeric nitrogen containing dispersants and fuel soluble alkoxylated derivatives of amines, said dispersants being present in an amount such that the weight of nitrogen present in the liquid composition is in the range of 8% to 100% of the total weight of said anti-foam agent, and said liquid composition exhibiting improved anti-foam properties when compared with the same composition containing no ashless dispersant.

2. The composition of claim 1 wherein the ashless dispersant is a hydrocarbyl succinimide or hydrocarbyl succinamide having a number average molecular weight of 500 to 2,000.

* * * * *